(12) United States Patent
Rose et al.

(10) Patent No.: US 10,686,940 B2
(45) Date of Patent: Jun. 16, 2020

(54) VIRTUAL CONFERENCE ROOM FOR TELEPHONIC CONFERENCING

(71) Applicant: Lenovo (Singapore) Pte. Ltd., New Tech Park (SG)

(72) Inventors: Amy Leigh Rose, Chapel Hill, NC (US); Nathan J. Peterson, Durham, NC (US); John Scott Crowe, Durham, NC (US); Bryan L. Young, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 856 days.

(21) Appl. No.: 14/293,496

(22) Filed: Jun. 2, 2014

(65) Prior Publication Data
US 2015/0350450 A1    Dec. 3, 2015

(51) Int. Cl.
*H04M 3/56* (2006.01)

(52) U.S. Cl.
CPC ........ *H04M 3/564* (2013.01); *H04M 2201/42* (2013.01); *H04M 2203/252* (2013.01)

(58) Field of Classification Search
CPC .................................................... H04M 3/563
USPC ........................................................ 715/753
See application file for complete search history.

(56) References Cited

U.S. PATENT DOCUMENTS

| 6,542,733 | B1* | 4/2003 | Dennis | H04M 3/44 455/414.1 |
| 8,749,610 | B1* | 6/2014 | Gossweiler | H04N 7/15 348/14.08 |
| 2002/0196931 | A1* | 12/2002 | Heo | H04M 1/26 379/355.01 |
| 2008/0037745 | A1* | 2/2008 | Ramamoorthy | H04M 3/56 379/201.01 |
| 2009/0089683 | A1* | 4/2009 | Thapa | H04N 7/15 715/756 |
| 2010/0251127 | A1* | 9/2010 | Geppert | G06F 3/04817 715/735 |
| 2011/0271212 | A1* | 11/2011 | Jones | H04L 12/1818 715/753 |
| 2013/0108034 | A1* | 5/2013 | Colbert | H04M 3/566 379/202.01 |
| 2013/0212289 | A1* | 8/2013 | Krishnakumar | H04L 12/1822 709/228 |

* cited by examiner

*Primary Examiner* — Angie Badawi
(74) *Attorney, Agent, or Firm* — John M. Rogitz; John L. Rogitz

(57) ABSTRACT

In one aspect, a device includes a processor and a memory accessible to the processor. The memory bears instructions executable by the processor to engage in telephonic communication with at least a second device and a third device and, in response to input to the first device and without the first device concluding the telephonic communication with the second and third devices, enable auditory telephonic communication of the first device with the second device and prevent auditory telephonic communication of the first device with the third device.

19 Claims, 7 Drawing Sheets

VIRTUAL CONFERENCE ROOM FOR TELEPHONIC CONFERENCING

I. FIELD

The present application relates generally to audio conferencing between devices.

II. BACKGROUND

During a conference call, participants may wish to conference with some but not all of the participants without disconnecting from the main conference e.g. so as to not bother the other participants with discussion that does not pertain to them, so as to protect confidential information, so as to not be rude but nonetheless speak in a language which other participants do not understand, etc., but still engage in the main conference when desired. There are currently no adequate, cost-effective solutions for doing so.

SUMMARY

Accordingly, in one aspect a device includes a processor and a memory accessible to the processor. The memory bears instructions executable by the processor to engage in telephonic communication with at least a second device and a third device and, in response to input to the first device and without the first device concluding the telephonic communication with the second and third devices, enable auditory telephonic communication of the first device with the second device and prevent auditory telephonic communication of the first device with the third device.

In another aspect, a method includes creating a virtual conference room to which at least first, second, and third devices are to connect to engage in a telephonic conference, facilitating engagement by the first, second, and third devices in the telephonic conference, and in response to user input to the first device, creating in the virtual conference room at least first and second virtual portions to facilitate conferencing by the first and second devices using the first virtual portion but excluding the third device from conferencing with the first and second devices using the first virtual portion.

In still another aspect, an apparatus includes a first processor, a network adapter, and storage bearing instructions. The instructions are executable by a second processor for enabling first conferencing between first, second, and third devices over a line of communication and, based on a command to one of the first, second, and third devices and without disconnecting the line of communication, enabling second conferencing over the line of communication which excludes one of the first, second, and third devices from communicating in the second conferencing. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
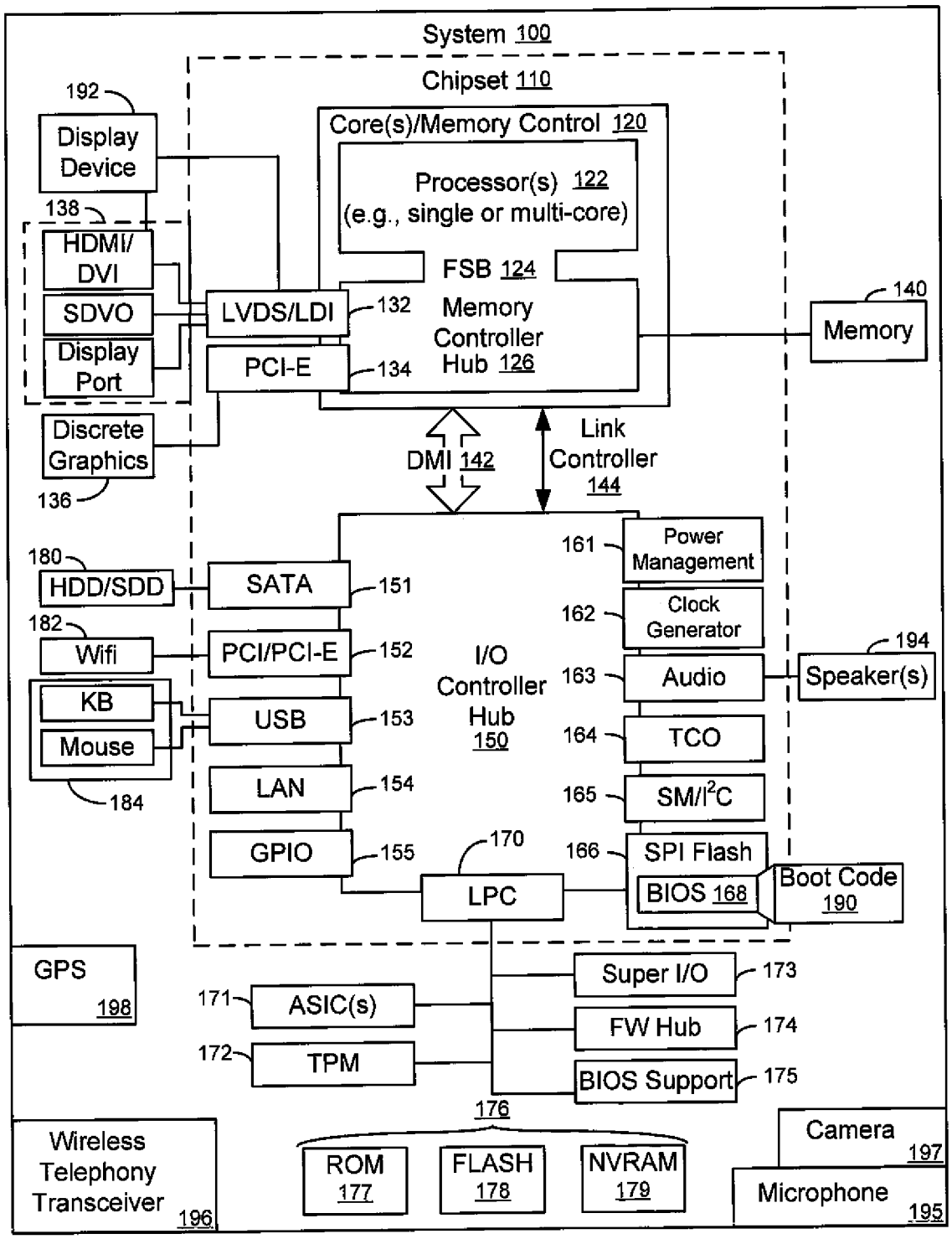
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 195 in communication with the processor 122 and providing input thereto based on e.g. a user providing audible input to the microphone 195. A wireless telephony transceiver 196 is also shown, which is in communication with and provides input to the processor 122 to communicate over a wireless telephone network and/or to communicate telephonically in accordance with present principles. Also shown is a camera 197 which may be, e.g., a thermal imaging camera, a digital camera such as a webcam, and/or a camera integrated into the system 100 and controllable by the processor 122 to gather pictures/images and/or video (e.g. of a user of the system 100).

Still in reference to FIG. 1, a GPS transceiver 198 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
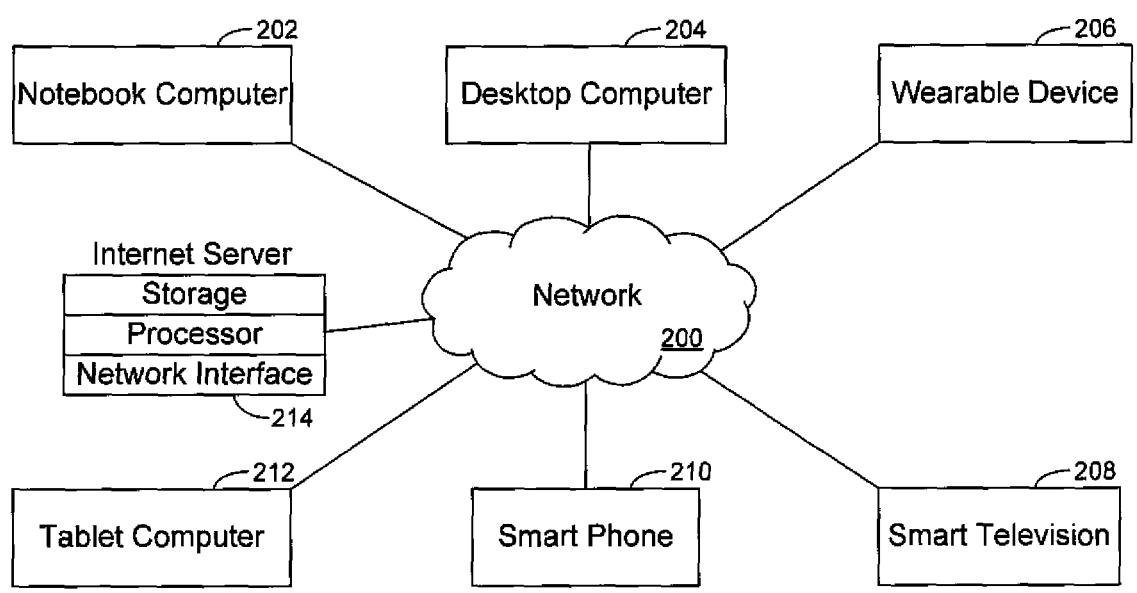
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
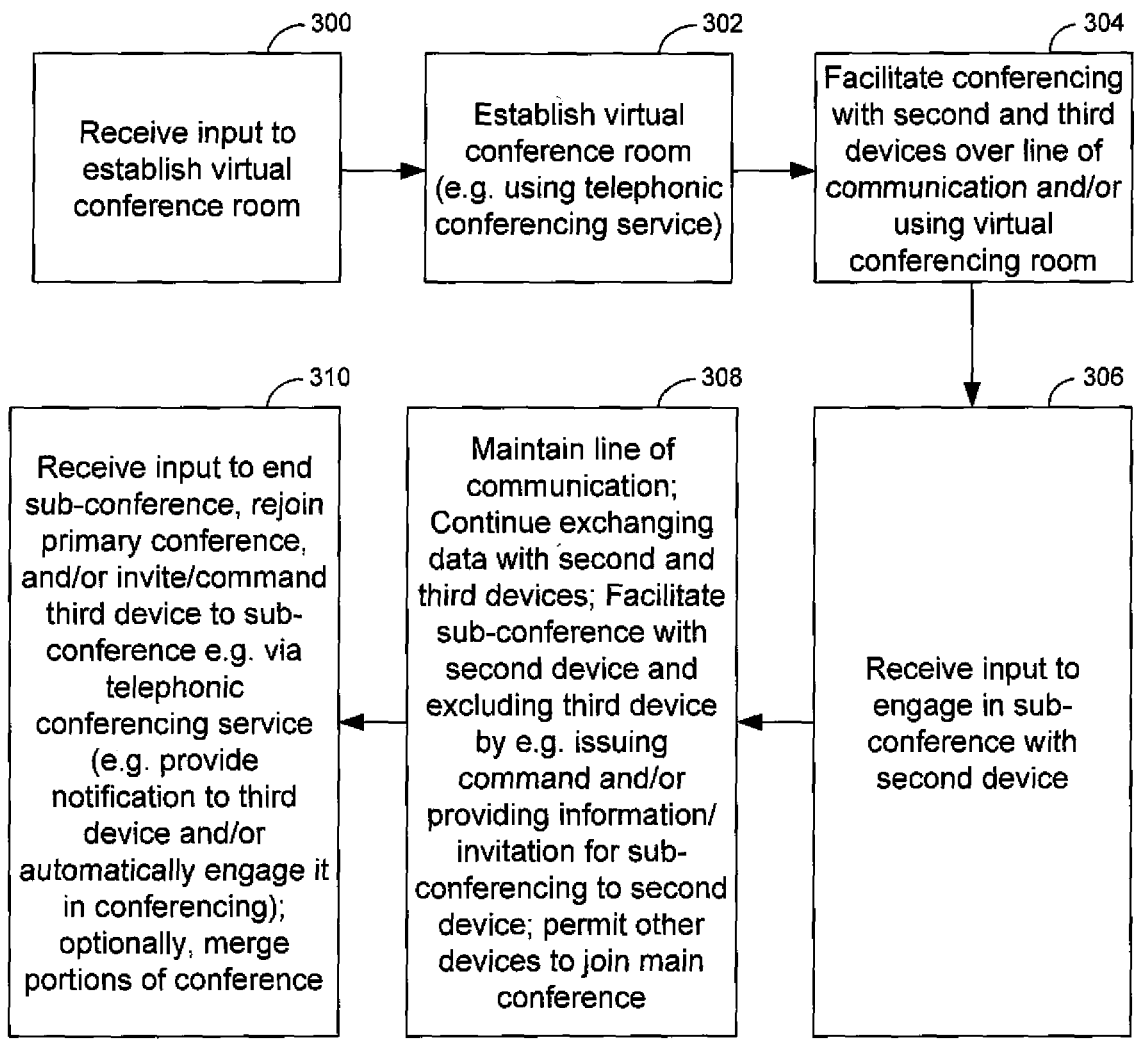
FIGS. 3 and 4 are flow charts showing example algorithms in accordance with present principles.

Referring to FIG. 3, it shows example logic that may be undertaken by a device such as the system 100 in accordance with present principles (referred to below as the "present device" and/or "first device"), it being understood that any of the devices referenced herein may undertake the present logic (and/or the logic of FIG. 4, and/or present any of the UIs described herein). Beginning at block 300, the logic receives input (e.g. from another device, and/or at the present device itself) to establish a virtual conference room for telephonic and/or text conferencing. The logic then proceeds to block 302 where the logic establishes at least one virtual conferencing room (e.g. using a telephonic conferencing application and/or service) to which other devices may connect and/or access to conference with the present device.

From block 302 the logic proceeds to block 304 where the logic facilitates conferencing of the present device with e.g. second and third devices over a line of communication (e.g. an IP connection, a telephone connection, etc.) by e.g. permitting the second and third devices to enter the virtual conferencing room and/or communicating with the second and third devices so that e.g. audible conferencing may occur therebetween. After block 304, the logic moves to block 306 where the logic receives input from the present device and/or from another device (e.g., the second device) to engage in a sub-conference with the second device.

Thus, in response to the input received at block 306, the logic proceeds to block 308 where the logic, while maintaining the (e.g. primary and/or same) line of communication established at block 304, and/or while continuing to conference with and/or exchange information with the second and third devices, facilitates and/or establishes a sub-conference (e.g. in a separate virtual room) with the second device. Thus, it is to be understood that in this example, the sub-conference excludes the third device such that the third device cannot audibly participate in and/or listen to the conference, even though e.g. the third device may continue audible conferencing in the primary conference room and/or even though the third device may continue text chatting with the first and second devices as will be described further below.

In any case, the sub-conference may be facilitated and/or established by the logic at least in part by e.g. issuing a command to the second device (and/or commanding the present device) to enter the sub-conference and/or to automatically participate in it without input from a user of the second device. In addition to or in lieu of issuing the command, the logic may also provide an invitation and/or information to the second device for engaging in the sub-conference (e.g. via email, via the telephone conferencing application which is hosting the virtual conferencing, etc.). Last, before moving on to block 310, it is to be understood that at block 308 the logic may also allow and/or continue to allow other devices to join the primary conference that was established at block 304.

Now in reference to block 310, the logic may receive input to the present device and/or from the second device to end the sub-conference, and/or to rejoin and/or continue communicating in the primary conference, using the telephonic conferencing service and/or application. In addition to or in lieu of the foregoing at block 310, the logic may invite and/or command the third device to join the sub-conference (e.g. provide a notification and/or invitation to the third device to do so and/or automatically "patch" it in to the sub-conference to participate in it). Also in addition to or in lieu of the foregoing at block 310, the logic may merge the sub-conference with the primary conference and/or another sub-conference which may or may not include participation by the first and/or second devices.

Figure 4:
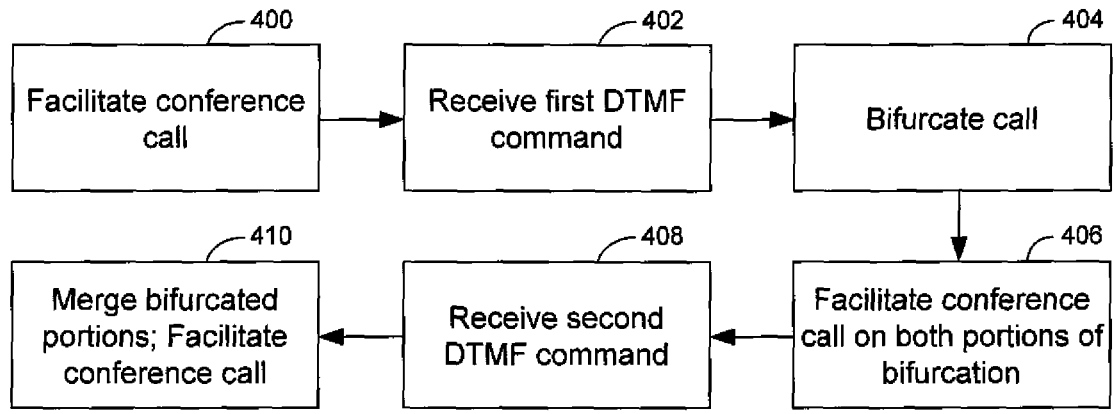

Turning now to FIG. 4, it shows example logic that may be undertaken by a device such as the system 100 in accordance with present principles (referred to below as the "present device" and/or "first device") e.g. in combination with or independently of the logic of FIG. 3. In any case, the logic begins at block 400 where the logic facilitates and/or establishes a conference call in accordance with present principles, which in the present example may be initiated e.g. in response to keypad input invoking e.g. dual-tone multi-frequency signaling (DTMF) to provide a command to e.g. a conferencing service facilitating and/or hosting the conferencing described herein. Regardless, from block 400 the logic proceeds to block 402 at which the logic receives a DTMF command to split, isolate, and/or bifurcate the conference call established at block 400, and thus at block 404 the logic bifurcates the conference call into e.g. two sub-conferences (or one sub-conference while continuing to facilitate and/or enable the main conference) in response to the input received at block 402.

The logic then proceeds to block 406 where the logic facilitates conferencing on both sub-conferences until such time as e.g. another DTMF command is received to join the two sub-conferences again, end the sub-conference, end the primary conference, etc. Accordingly, such a DTMF command is received at block 408, and then at block 410 the logic undertakes an action associated with the command, such as e.g. merging bifurcated sub-conferences into a primary conference responsive to receiving a command at block 408 to do so. Also at block 410, the logic then continues to facilitate the primary conference call until it is ended and/or until another DTMF command is received.

Figure 5:
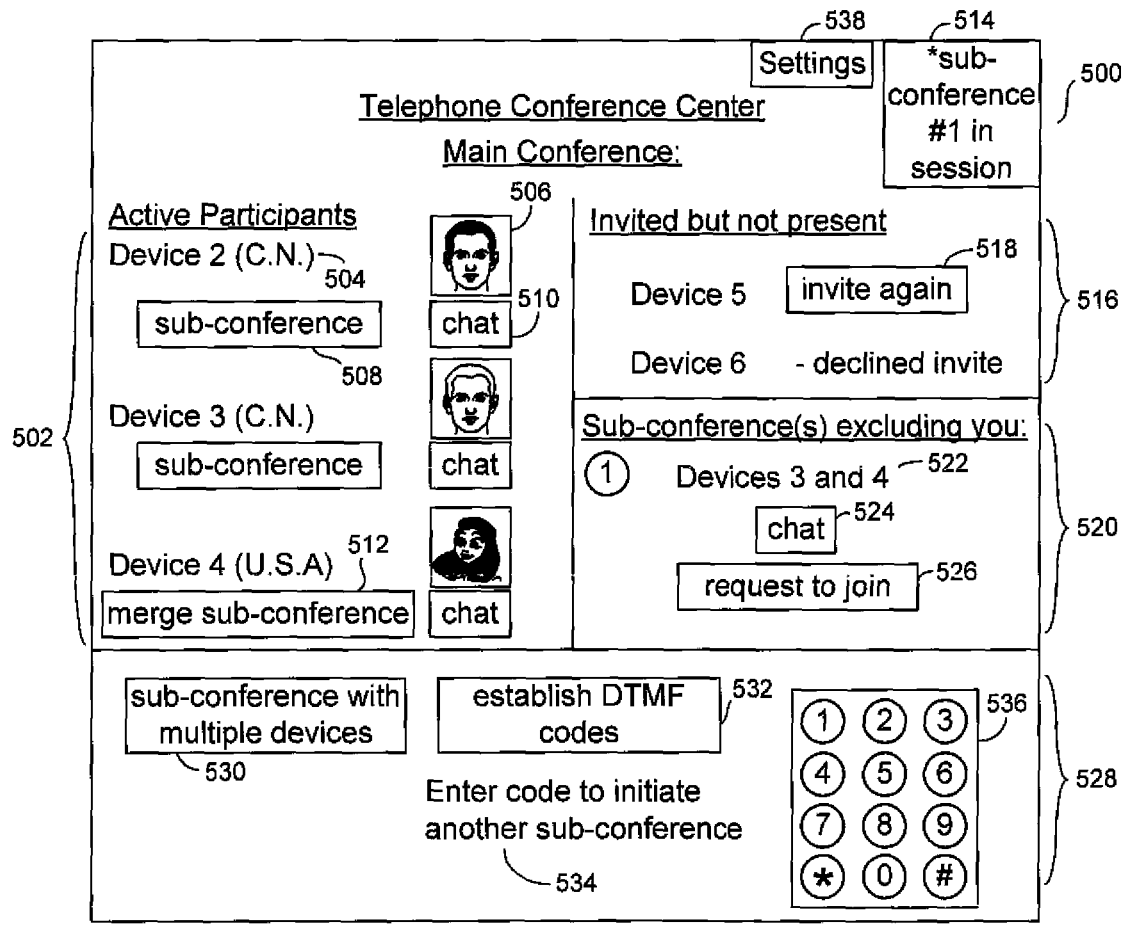
FIG. 5-11 are example user interfaces (UI) in accordance with present principles.

Continuing the detailed description now in reference to FIG. 5, it shows an example user interface (UI) that may be presented on a device such as the system 100 in accordance with present principles. It is to be understood that the UI 500 may be presented e.g. when the device presenting it is engaged in a telephonic conference using e.g. a telephonic conferencing service and/or application in accordance with present principles.

As may be appreciated from the UI 500, it includes information pertaining to a main and/or primary audible conference in which the device presenting the UI 500 (referred to below as the "present device") is engage. Note that the UI 500 includes a first section 502 listing other participants in the main conference. Taking the entry for Device Two in section 502 as an example, note that it indicates the location 504 (e.g. at least the country, which in this case is China, but also e.g. city, state, etc.) from which the person associated with the device is conferencing and/or where Device Two is currently located. The location 504 may be determined based on e.g. GPS data provided by Device Two from a GPS transceiver on Device Two.

The entry for Device Two also includes an image (e.g. photograph of the user of Device Two such as a photograph from a profile of the user of Device Two associated the conferencing application) and/or avatar 506 for the user of Device Two. Furthermore, in some embodiments the image 506 may be e.g. a real-time video feed of the user of Device Two as the user participates in the conference (e.g. based on input from a camera on Device Two gathering images of the user). In any case, note that the entry for Device Two in section 502 also includes a sub-conference selector element 508 that is understood to be selectable to automatically without further user input e.g. bifurcate the conference for the present device to engage in a sub-conference at least with Device Two, transmit an invitation and/or command at least to Device Two to engage in a sub-conference with the present device, and/or present another UI on the present device for initiating and/or engaging in a sub-conference at least with Device Two. Still further, a chat selector element 510 is shown which is understood to be selectable to automatically without further user input initiate a text chatting session with Device Two, transmit an invitation and/or command at least to Device Two to engage in chat session with the present device, and/or present another UI on the present device for initiating and/or engaging in a chat session at least with Device Two.

Still in reference to section 502, note that the entry for Device Four includes a merge sub-conference selector element 512 where a sub-conference selector element would otherwise be presented. An element such as the element 512 is understood to be presented on the present device when e.g. the present device is already engaging in a sub-conference with the other device, in this case Device Four. Note that a selector element 514 is also shown on the UI 500 and indicates that the present device is not only participating in the primary conference but is also participating in a sub-conference. The selector element 514 is understood to be selectable to automatically without further user input cause a UI such as the UI 600 (which will be described shortly) to be presented. In any case, note that selection of the merge sub-conference selector element 512 is selectable to automatically without further user input responsive thereto merge the sub-conference between the present device and Device Four with the primary conference in which e.g. Device Two and Device Three are also active participants.

Still in reference to FIG. 5, another section 516 is shown. The section 516 presents a listing of devices that have been invited to participate in the primary conference but have not actually joined in participation. Note that the entry for Device Five has an invite again selector element 518 associated therewith, which is understood to be selectable to automatically without further user input cause the present device and/or conferencing application to generate and transmit another invitation to Device Five for Device Five to participate. Also note that the entry for Device Six includes a notation that the user of Device Six affirmatively declined the invitation. Thus, note that in some embodiments an element similar in function and configuration to the element 518 may not be presented when a device such as Device Six has affirmatively declined an invitation.

Yet another section 520 is shown on the UI 500. The section 520 presents a listing of devices that are participating in sub-conferences in which the present device is not participating, either e.g. because the present device did not join the sub-conference after receiving an invitation or because the present device was prohibited or excluded by another device and/or user from participating in a particular sub-conference. In any case, note that the section 520 includes at least a first entry 522 pertaining to a sub-conference between Device Three and Device Four in which the present device is not a participant. Note that the entry 522 also includes a chat selector element 524 that is selectable to automatically without further user input responsive thereto initiate a text chat session with Device Three and Device Four. Also note that the entry 522 includes a request to join selector element 526 that is selectable to automatically without further user input responsive thereto send a request to Device Three and/or Device Four (e.g. or, optionally, only the device of Device Three and Device Four that initiated their sub-conference) to participate in their sub-conference.

Still in reference to the UI 500 of FIG. 5, a fourth section 528 is shown. The section 528 includes e.g. a sub-conference initiation selector element 530 that is selectable to automatically without further user input responsive thereto cause another UI to be presented to which information may be provided on one or more devices and/or users which the present device is to sub-conference with, and/or automatically initiate the sub-conference itself and/or create another virtual room for the sub-conference.

The section 528 also includes an establish DTMF codes selector element 532 that is selectable to automatically without further user input responsive thereto cause the present device to present a UI such as the UI 700 (which will be described below in reference to FIG. 7) to be presented, and/or to otherwise present an interface on the present device for establishing DTMF codes for use in accordance with present principles. Furthermore, note that a keypad 536 may be presented on the UI 500 for e.g. entering a DTMF sequence thereto which automatically without further user input may initiate a sub-conference when e.g. the conferencing application has been preconfigured (e.g. by a user of the present device prior to the primary conference) to automatically create a sub-conference in response to a particular DTMF sequence being provided to the conferencing service using the keypad 536. Thus, it may be appreciated that a user of the present device may initiate a sub-conference using such a DTMF sequence and furthermore a user of a device not presenting the UI 500 and/or not even configured to present the UI 500 (e.g., an office telephone or a pay phone) may similarly input the same DTMF sequence to initiate and be placed into a sub-conference per the preconfigured settings for a sub-conference to be created in response to receipt of the DTMF sequence.

Still in reference to the UI 500, note that a settings selector element 538 is also shown and is selectable to automatically without further user input responsive thereto cause a settings UI such as the UI 1100 to be described below to be presented.

Figure 6:
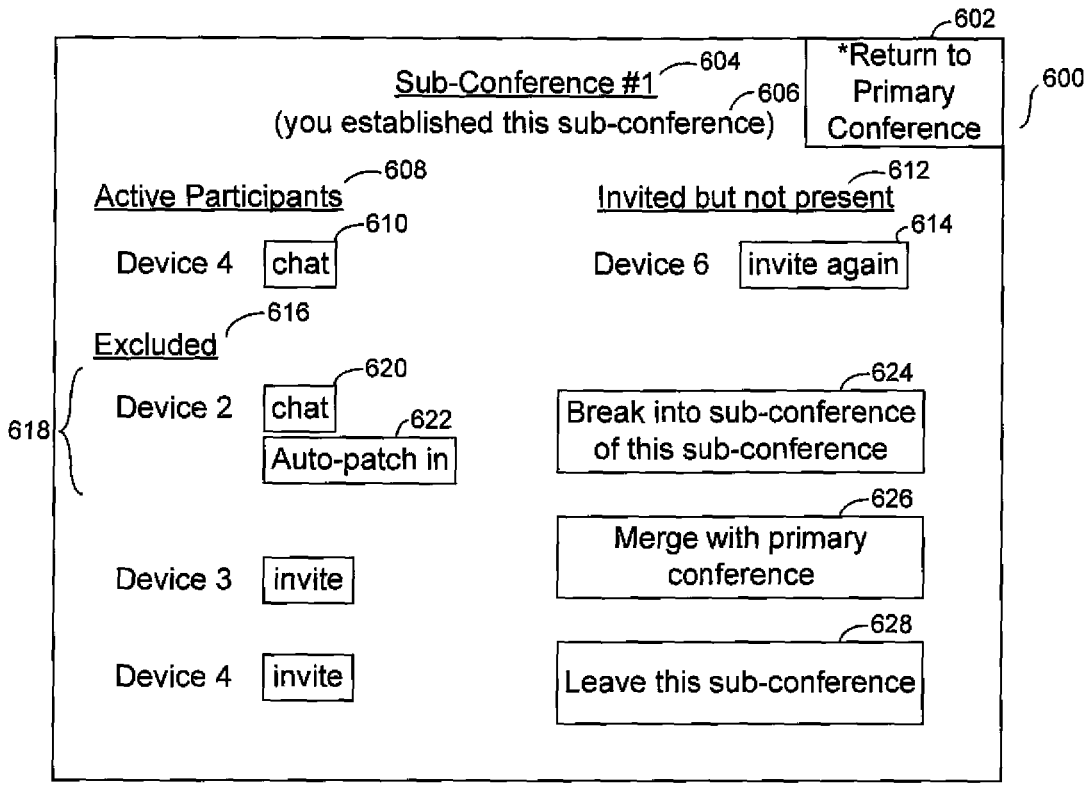

Now in reference to FIG. 6, it shows a UI 600 which may be presented on a device in accordance with present principles when e.g. the device is participating in a sub-conference of a primary conference in which the device is also participating. Note that the UI 600 includes a selector element 602 that is selectable to automatically without further user input responsive thereto cause a primary conference UI such as e.g. the UI 500 to be presented. Note that in some embodiments, selection of the selector element 602 may also end the present device's participation in the sub-conference and/or conclude the sub-conference altogether, while in other embodiments the element 602 may present a primary conference UI but still e.g. maintain the present device's participation in the sub-conference.

Regardless, note that the UI 600 also includes a title 604 indicating the title of the sub-conference, along with an indication 606 of which user and/or device initiated the sub-conference. The UI 600 also includes a listing 608 of participants and/or devices of the sub-conference other than the present device, where e.g. each participant and/or device in the listing 608 may have a chat selector element 610 associated therewith that is selectable to automatically without further user input responsive thereto initiate a text chat session with the associated device. Furthermore, the UI 600 includes a listing 612 of users and/or devices that have been invited to, but are not currently participating in, the sub-conference, where each user and/or device in the listing 612 may have an invite again selector element 614 associated therewith that is selectable to automatically without further user input responsive thereto transmit another invitation to that user and/or device to participate in the sub-conference.

Still in reference to the UT 600, it also includes a listing 616 of devices and/or users which have been excluded from the sub-conference. Note that the listing 616 includes at least one entry 618, where the entry 618 in this example pertains to Device Two. Note that it includes an invite selector element 620 that is selectable to automatically without further user input responsive thereto transmit an invitation to the user of Device Two and/or to Device Two itself to participate in the sub-conference. The entry 618 also includes an automatically patch in selector element 622 that is selectable to automatically without further user input responsive thereto bring Device Two into the sub-conference to participate without e.g. any action being taken by a user of Device Two in order to have audio from the sub-conference being presented on Device Two and/or without any consent being provided by the user of Device Two to participate in the sub-conference.

In addition to the foregoing, the UI 600 may include other selector elements, such as the selector element 624 shown that is selectable to automatically without further user input responsive thereto initiate a sub-conference of the sub-conference. E.g., should more than two devices be participating in the sub-conference, a sub-conference of that sub-conference may be initiated where only e.g. two of the devices participating in the sub-conference may themselves participate in a sub-conference. Another selector element 626 is shown that is selectable to automatically without further user input responsive thereto merge the sub-conference with the primary conference. A selector element 628 is also shown that is selectable to automatically without further user input responsive thereto cause the present device to leave the sub-conference (e.g. but still participate in the primary conference).

Figure 7:
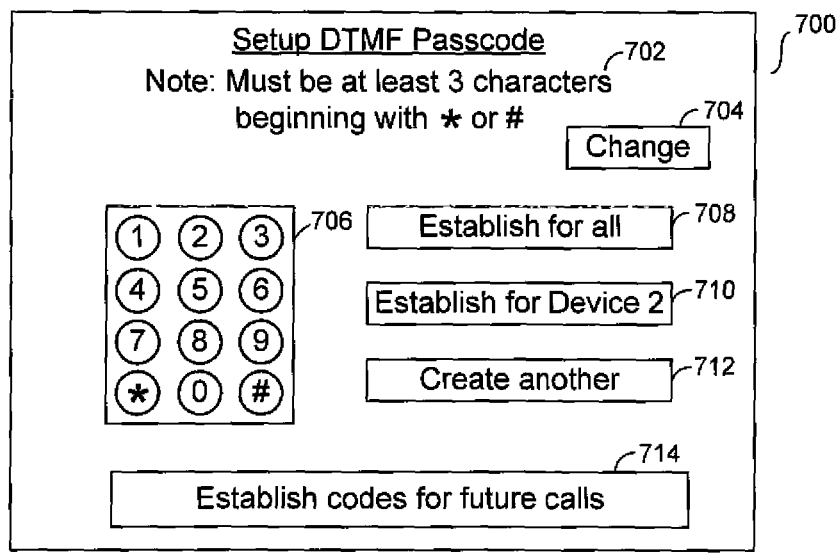

Turning now to FIG. 7, it shows a UI 700 to establish DTMF codes and/or sequences for conferencing. Codes may be established e.g. to initiate a conference or sub-conference, to access a conference or sub-conference (e.g. a DTMF password), to leave a conference or sub-conference, to merge a sub-conference with another conference (e.g. a primary conference or another sub-conference), etc. In any case, note that the UI 700 may include instructions 702 such as e.g. that any DTMF sequence to be established is to conform to the parameters provided in the instructions. In the present instance, a DTMF sequence established using the UI 700 is to include at least three characters and the beginning one of those characters is to be a star sign or a pound sign. Also note that the instructions 702 have a selector element 704 associated therewith that is selectable to automatically without further user input responsive thereto e.g. present another UI for which to alter the parameters for creating a DTMF sequence.

Still in reference to FIG. 7, the UI 700 also includes a keypad 706 for entering a DTMF sequence. The UI 700 also includes various selector elements which may be selected e.g. either (e.g. immediately) before and/or after entering a DTMF sequence to configure the present device and/or conferencing service to associate the DTMF sequence accordingly. Thus, an establish for all selector element 708 is shown that is selectable to automatically without further user input responsive thereto establish a DTFM code entered to the keypad 706 for all devices to participate in a given conference or sub-conference, as well as an establish for particular device selector element 708 that is selectable to automatically without further user input responsive thereto establish a DTFM code entered to the keypad 706 for a particular device to participate in a given conference or sub-conference, such as e.g. Device Two. Thus, it may be appreciated that plural different DTFM sequences may be created for different respective devices to participate in the same conference or sub-conference.

In addition to the foregoing, the UI 700 also includes a create another selector element 712 which is selectable to automatically without further user input responsive thereto configure the present device and/or conferencing service to e.g. save an already input DTFM sequence and receive another DTFM sequence. Last, note that a selector element 714 is also shown for selection to e.g. use a keypad such as the keypad 706 to establish DTFM sequences for still other conferences to take place.

Figure 8:
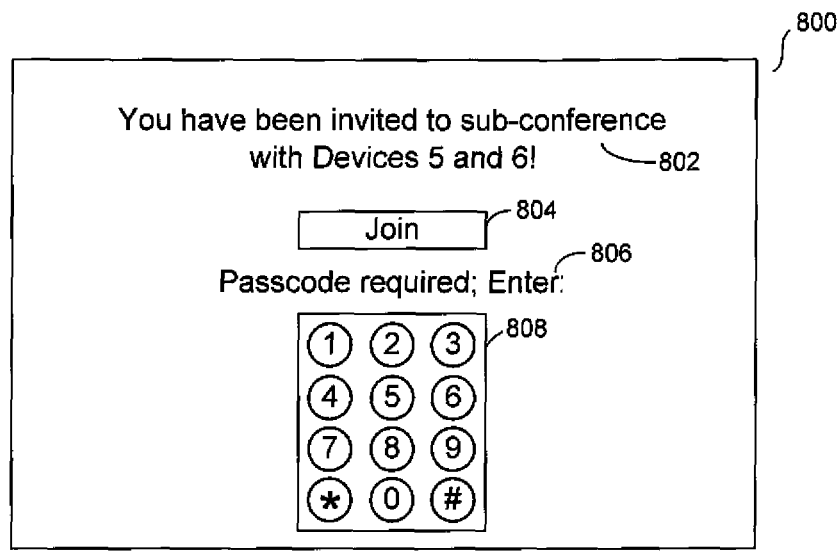

Now in reference to FIG. 8, it shows a UI 800 which may be e.g. an invitation and/or notification provided to a device for the device to engage in a conference or sub-conference. Thus, in this example, the UI 800 includes a notification 802 that the device has been invited to participate in a sub-conference with Device Five and Device Six. A join selector element 804 is also shown, it being understood that the element 804 is selectable to automatically without further user input responsive thereto join the sub-conference and/or begin participating in the sub-conference. Optionally, a prompt 806 may also be presented when e.g. a DTMF sequence or other password has been required to participate in the sub-conference with Device Five and Device Six, and accordingly a keypad 808 is also presented for entering the DTMF sequence or password to participate.

Figure 9:
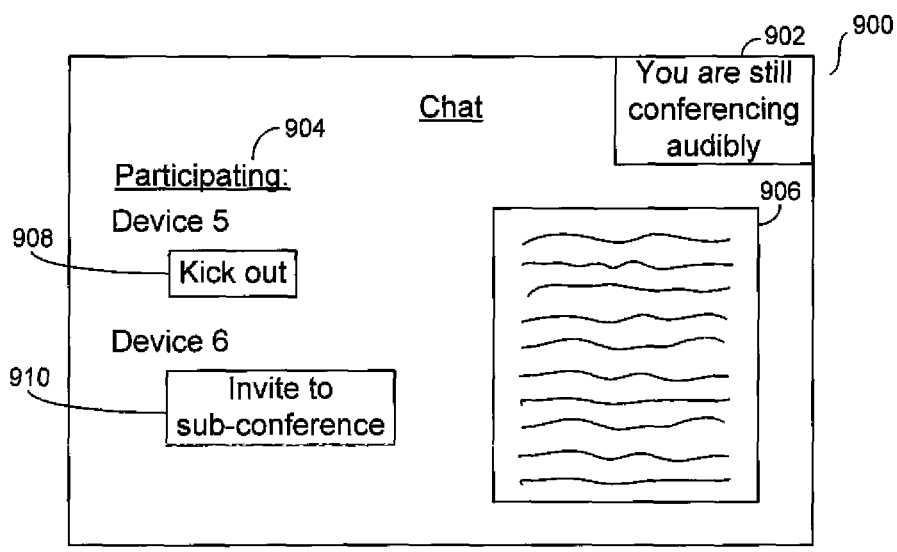

Turning now to FIG. 9, it shows a UI 900 for engaging in text chatting while participating in a conference or sub-conference. Thus, e.g., the UI 900 may be presented automatically without further user input responsive to selection of the chat selector elements discussed herein (e.g. the element 510). The UI 900 includes a selector element 902 that is selectable to automatically without further user input cause a conferencing UI such as the UI 500 or UI 600 to be presented, and also indicates thereon that the device presenting the UI 900 is still participating audibly in the conference.

In addition, the UI 900 includes a listing 904 of devices participating in the text chat, along with a text chat box 906 for entering and presenting text which may also be presented on displays of e.g. Device Five and Device Six presenting UIs similar to the UI 900 for the same chat session. Note that the entry for Device Five in the listing 904 includes a selector element 908 for automatically and without further user input responsive thereto excluding Device Five from further participating in the text chatting and/or causing a UI similar to the UI 900 that is presented on Device Five for participating in the chatting represented in box 906 to close. Still further, a selector element 910 may be presented on the UI 900 for an entry in the listing 904, such as in the present example for Device Six. The element 910 is selectable to automatically without further user input responsive thereto initiate a sub-conference with Device Six (e.g. and excluding Device Five).

Figure 10:
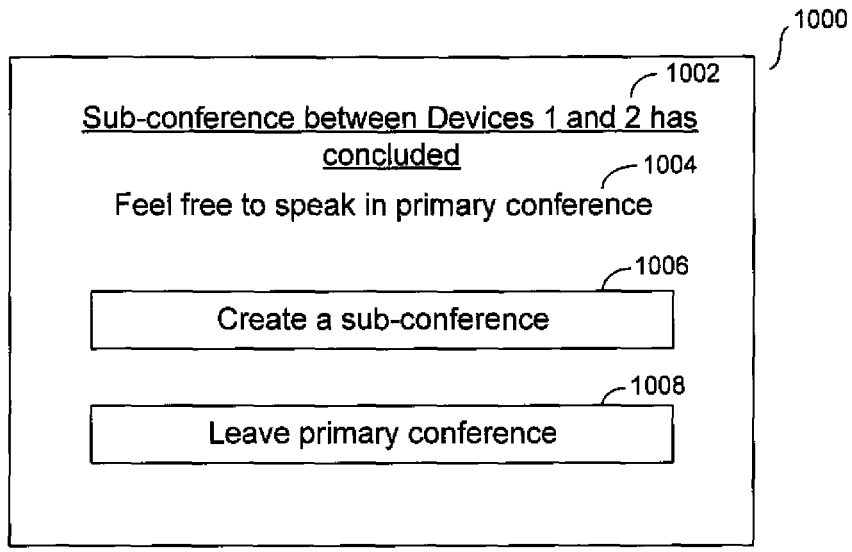

Continuing the detailed description in reference to FIG. 10, it shows a UI 1000 that may be presented on a device after conclusion of a conference or sub-conference. Thus, it includes an indication 1002 that (in this example) a sub-conference between Device One and Device Two has concluded. The UI 1000 also includes another indication 1004 that the user of the device presenting the UI 1000 may speak in a primary conference. Thus, e.g., it may be appreciated that upon conclusion of a sub-conference, the device may automatically begin presenting audio from the primary conference and provide audible input from the user of the device to other conferees in the primary conference. In any case, note that a selector element 1006 is shown that is selectable to create and/or initiate another sub-conference in accordance with present principles, and a selector element 1008 is shown that is selectable to automatically without further user input cause the device presenting the UI 1000 to cease participating in the primary conference (e.g., causing the device to "hang up").

Figure 11:
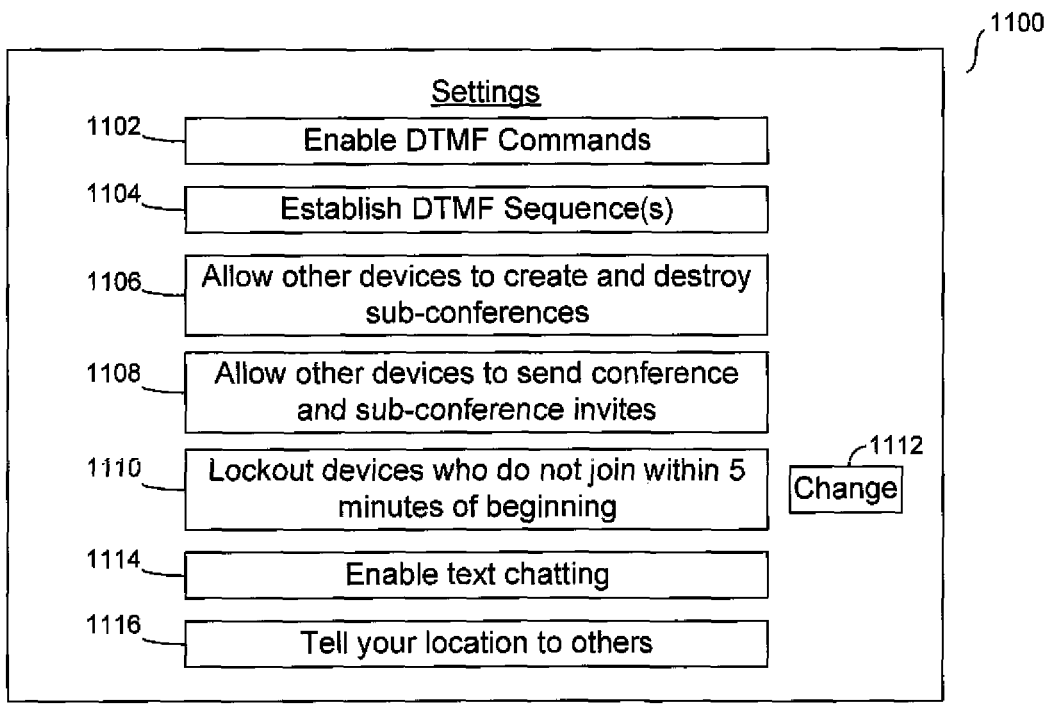

Now in reference to FIG. 11, it shows a UI 1100 for configuring settings for conferencing in accordance with present principles. Note that each of the following selector elements are understood to be selectable to automatically without further user input responsive thereto configure the device presenting the UI 1100 to execute the function and/or configure the setting associated with the respective selector element. Also note that each of the settings may apply to conferencing and sub-conferencing, although it is to be understood that each of the settings may be separately configured (e.g. with different settings) for primary conferencing and sub-conferencing.

Regardless, a selector element 1102 is shown for enabling DTMF commands to be used during conferencing. A selector element 1104 is also shown for establishing one or more DTMF sequences (e.g. selection of the element 1104 may cause the device to automatically without further user input present the UI 700). Yet another selector element 1106 is shown for allowing other devices (e.g. besides the device presenting the UI 1100) to create and/or destroy sub-conferences (e.g. end and eliminate, and also be placed back into primary conferencing). A selector element 1108 is shown for allowing other devices (e.g. besides the device presenting the UI 1100) to send invitations to participate in conferences. A selector element 1110 is shown for preventing (e.g., "locking out") devices from joining a conference or sub-conference when they attempt to join more than a threshold time after beginning of the conference (e.g. the scheduled start time, the time the first user joins, the time audible conversing commences, etc.). Note that the threshold time in the present example is five minutes, and also note that the threshold time may be changed by a user at least in part in response to selection of the selector element 1112.

Still further, a selector element 1114 is shown for enabling text chatting while participating in a conference or sub-conference in accordance with present principles. Last, the example UI 1100 includes a selector element 1116 for providing location information on the location of the device presenting the UI 1110 to other devices when conferencing (e.g. so that the location information may be presented on the other devices).

Without reference to any particular figure, it is to be understood that e.g. when engaged in a sub-conference in accordance with present principles, in some embodiments audio from both the primary conference and sub-conference may be presented (e.g. when occurring simultaneously), while in other embodiments only audio from the sub-conference may be presented even if the primary conference is also occurring, and vice versa. However, also note that in such a situation where audio for the sub-conference only is being presented, a user may toggle back and forth between the sub-conference audio and the primary conference audio using e.g. a selector element on a UI such as the UIs 500 and 600. Additionally, note that while a device is engaged in a sub-conference in accordance with present principles, it may still communicate with other devices participating in the primary conference but not the sub-conference via e.g. text chat.

Also without reference to any particular figure, it is to be understood that the steps, algorithms, logic, presentation of UIs, etc. described herein may be undertaken locally at a device as described herein, and/or may also be controlled by a server or other device that is coordinating the conferencing, hosting the conferencing service, etc.

Furthermore, even though many of the functions such as e.g. creating a sub-conference and/or inviting others to a sub-conference are described above as being executable at any of the devices described herein, in some embodiments only a e.g. conference leader or designated person may do so via their respective designated device.

Still without reference to any particular figure, it is to be further understood that e.g. upon devices leaving a conference or sub-conference, once the last device leaves and no more devices are currently in the conference or sub-conference, the conference may conclude and/or any virtual rooms or portions created for conferencing may be end (e.g. be destroyed or otherwise cease to exist).

Based on the foregoing detailed description, it may now be appreciated that during a conference call, callers may be permitted to discuss things amongst a sub-group of themselves without having the whole conference hear the conversation (for example, if a couple of callers would like to discuss something in another language, or discuss confidential information in a call between companies). E.g., devices, systems, and methods are disclosed for dynamically controlling the conference call, conceptually speaking, as if all the callers are physically in a room together. Callers may then "step out of the room" by engaging in a sub-conference as described herein, and/or be segregated into groups while on the conference call and then "step back into the room" or otherwise rejoin to the general conference. The foregoing may be done by the call leader, a designated representative, or anyone else. Callers may rejoin general conference by e.g. pressing a dial tone combination or inputting a command e.g. to a selector element.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave.

While the particular VIRTUAL CONFERENCE ROOM FOR TELEPHONIC CONFERENCING is herein shown and described in detail, it is to be understood that the subject matter which is encompassed by the present application is limited only by the claims.

What is claimed is:

1. A first device, comprising:
   at least one processor; and
   storage accessible to the at least one processor and bearing instructions executable by the at least one processor to:
   engage in telephonic communication with at least a second device and a third device, the telephonic communication at least in part establishing a primary conference;
   in response to input to the first device and without the first device concluding the telephonic communication with the second and third devices, enable auditory telephonic communication of the first device with the second device to at least in part establish a sub-conference and prevent auditory telephonic communication of the first device with the third device and
   responsive at least in part to the second device not joining the sub-conference within a threshold amount of time of a beginning of the sub-conference, prevent the second device from joining the sub-conference.

2. The first device of claim 1, wherein enablement of the auditory telephonic communication with the second device to at least in part establish the sub-conference comprises issuance of commands to the first and second devices for the first and second devices to enable audible conversing therebetween without the audible conversing being audibly presented on the third device.

3. The first device of claim 1, wherein the sub-conference is a first sub-conference, and wherein the instructions are executable by the at least one processor to:
   present a first user interface (UI) on a display accessible to the at least one processor, the first UI comprising a listing of devices that are participating in an excluded sub-conference in which the first device is not participating, the excluded sub-conference being different from the first sub-conference, the first UI comprising at least one selector selectable to automatically without further user input send a request to one or more of the devices that are participating in the excluded sub-conference to join the excluded sub-conference;
   wherein the input is provided to the first device based at least in part on input to a second UI presented on the display, wherein the second UI comprises a keypad that includes at least one key associated with a number from zero to nine, and wherein the input to the second UI comprises selection of a sequence of keys from the keypad.

4. The first device of claim 3, wherein the selection of the sequence of keys comprises selection of at least key selected from the group consisting of: a star sign key, a pound sign key.

5. The first device of claim 3, wherein the sequence of keys is established at the first device prior to the engagement of the first device in the telephonic communication with the second and third devices that at least in part establishes the primary conference.

6. The first device of claim 5, wherein the sequence of keys is established based on input to a third UI different from the second UI.

7. The first device of claim 3, wherein the instructions are executable by the at least one processor to:
   present a third UI on the display at which different dual-tone multi-frequency signaling (DTMF) codes may be established for respective devices to participate in the telephonic communication, each different DTMF code being for a single device to participate in the telephonic communication and no other devices that are to participate in the telephonic communication.

8. The first device of claim 3, wherein the instructions are executable by the at least one processor to:
   present a third UI on the display, the third UI comprising a selector element that is selectable to enable use of dual-tone multi-frequency signaling (DTMF) codes for participating in telephonic communications between devices.

9. The first device of claim 3, comprising the display.

10. The first device of claim 3, wherein the first UI comprises at least one selector element that is selectable to toggle between presentation on the display of data related to the primary conference and presentation on the display of data related to the sub-conference.

11. The first device of claim 1, wherein the instructions are executable to:
    enable the auditory telephonic communication of the first device with the second device to establish the sub-conference responsive to the second device joining the sub-conference within the threshold amount of time of the beginning of the sub-conference.

12. A method, comprising:
    creating a virtual conference room to which at least first, second, and third devices are to connect to engage in a primary telephonic conference;
    facilitating engagement by the first, second, and third devices in the primary telephonic conference;
    in response to user input to the first device, creating, in the virtual conference room, a sub-conference to facilitate conferencing by the first and second devices but excluding the third device from conferencing with the first and second devices using the sub-conference, wherein the second device is locked out of the sub-conference based at least in part on the second device not joining the sub-conference within a threshold amount of time of a beginning of the sub-conference.

13. The method of claim 12, wherein the method comprises, in response to the user input to the first device, transmitting an invitation to the second device for the second device to engage in conferencing with the first device.

14. The method of claim 12, further comprising:
in response to the first and second devices exiting the sub-conference to engage in conferencing with the third device, automatically eliminating the sub-conference and facilitating engagement by the first, second, and third devices in the primary telephonic conference using the virtual conference room.

15. The method of claim 12, wherein the virtual conference room is created at least in part using a telephonic conferencing application, instances of which on the first, second, and third devices presents a user interface (UI) comprising a selector element thereon that is selectable to automatically engage the respective device on which the UI is presented in the primary telephonic conference with the other two of the first, second, and third devices.

16. The method of claim 12, wherein the user input to the first device comprises user input of a first dual-tone multi-frequency signaling (DTMF) command, and wherein the method comprises:
in response to user input to the first device of a second DTMF command, controlling the first device to leave the sub-conference so that the second device can continue to use the sub-conference after the first device leaves the sub-conference.

17. The method of claim 16, comprising:
in response to user input to the first device of the second DTMF command, controlling the first device to permit conferencing, using the primary telephonic conference, with the second and third devices.

18. The method of claim 12, comprising:
while facilitating conferencing by the first and second devices but excluding the third device from conferencing with the first and second devices using the sub-conference, still facilitating text chatting between the first device, the second device, and the third device.

19. An apparatus, comprising:
a first processor;
a network adapter;
storage bearing instructions executable by a second processor for:
enabling primary conferencing between first, second, and third devices over a line of communication;
based on a command to one of the first, second, and third devices and without disconnecting the line of communication, enabling sub-conferencing between at least the second and third devices over the line of communication which excludes at least the first device from auditory communication in the sub-conferencing, wherein either one of the second and third devices is prevented from participating in the sub-conferencing based at least in part on not joining the sub-conferencing within a threshold amount of time of a beginning of the sub-conferencing;
wherein the first processor transfers the instructions over a network via the network adapter.

* * * * *